United States Patent [19]
Heide

[11] Patent Number: 5,581,634
[45] Date of Patent: Dec. 3, 1996

[54] RECOGNITION SYSTEM WITH AN AUTOMATED DEVELOPMENT TOOL

[75] Inventor: Scott S. Heide, Medfield, Mass.

[73] Assignee: Perception Software Corporation, Medfield, Mass.

[21] Appl. No.: 223,832

[22] Filed: Apr. 6, 1994

Related U.S. Application Data

[63] Continuation of Ser. No. 931,845, Aug. 18, 1992, abandoned.

[51] Int. Cl.$^6$ .............................. G06K 9/68; G06K 9/70
[52] U.S. Cl. ......................... 382/226; 382/203; 382/224
[58] Field of Search ................................. 382/37, 36, 18, 382/38, 224, 226, 227, 159, 177, 202, 203; 355/575; 364/300

[56] References Cited

U.S. PATENT DOCUMENTS

| | | | |
|---|---|---|---|
| 4,561,105 | 12/1985 | Crane et al. | 382/185 |
| 4,573,196 | 2/1986 | Crane et al. | 382/185 |
| 4,718,102 | 1/1988 | Crane et al. | 382/185 |
| 4,949,388 | 8/1990 | Bhaskaran | 382/159 |
| 4,975,975 | 12/1990 | Filipski | 382/227 |
| 4,989,258 | 1/1991 | Takahashi et al. | 382/37 |
| 5,001,765 | 3/1991 | Jeanty | 382/179 |
| 5,029,223 | 7/1991 | Fujisaki | 382/187 |
| 5,050,219 | 9/1991 | Maury | 382/13 |
| 5,067,165 | 11/1991 | Nishida | 382/19 |

OTHER PUBLICATIONS

Fu, King–Sun, "Syntactic Pattern Recognition", Academic Press, Handbook of Pattern Recognition and Image Processing, 1986, pp. 85–114.

King–Sun Fu et al., "Tree Systems for Syntactic Pattern Recognition", *IEEE Transactions on Computers*, 22(12):1087–1099 (Dec. 1973).

Filipski, Alan, "Recognition of Hand–lettered Characters in the GTX 5000 Drawing Processor", *Proc. of Computer Vision and Pattern Recognition 1989* pp. 686–691 (Jun. 1989), Abstract.

Takahasi et al., "A Hybrid Recognition Algorithm with Learning Capability and Its Application to an OCR System", *Transactions of the Institute of Electronics, Information and Communication Engineers of Japan*, E73(4):577–585 (Apr. 1990).

*Primary Examiner*—Jose L. Couso
*Assistant Examiner*—Matthew C. Bella
*Attorney, Agent, or Firm*—Hamilton, Brook, Smith & Reynolds, P.C.

[57] ABSTRACT

A recognition system that includes a development subsystem and production subsystem is disclosed. The development subsystem includes a user interface that enables a developer to describe the objects to be recognized and their relationships in a recognition tree; a data store system for storing the descriptions; and a technique for automatically generating a decision tree from the object descriptions. The production subsystem includes an engine for executing the tests on the input data at each node of the decision tree, traversing the decision tree, building a collection of identified objects, and finding the leaf of the decision tree that is the answer for a given input.

17 Claims, 12 Drawing Sheets

Fig. 4

Recognition-Object Slots (410)

name
    properties
    predicates
    children
    fence-objects
    context-keys

Child-object Slots (412)

name
    type
    inputs

Predicate-Object Slots (414)

name
    arg-spec-1
    arg-spec-2
    .
    .
    .
    arg-spec-N
    reference-1
    (reference-2)

Inverted-recognition-tree Slots (416)

inverted-recognition-objects
    type
    other-objects
    fence-objects.

Decision-tree-node Slots (418)

test
    true-branch
    false-branch.

Discovered-item Slots (420)

recognition-object-name
    input-entity-name
    child-1
    child-2.

RECOGNITION SYSTEM WITH AN AUTOMATED DEVELOPMENT TOOL

This application is a continuation of application Ser. No. 07/931,845 filed Aug. 18, 1992, now abandoned.

BACKGROUND OF THE INVENTION

This invention relates to the mechanisms and methods that take as their input raw and unstructured data and manipulates it to identify patterns within it and to organize and structure it in a more useful way for further processing or output.

The evolution of computers and especially the integration of computers with other machines has generated benefits to society in many areas, including manufacturing, transportation, communications, consumer products, and medicine.

Unfortunately there are some bottlenecks in this evolutionary process. For example, the effectiveness of programs is limited by the data that can be input to them and it is often necessary for specially-trained people to enter the data carefully via keyboard or mouse. This severely limits the potential of many computer applications by artificially limiting the population able to use the computer.

Since the beginning of the computer industry, researchers have explored the possibility of creating computers and computer programs that can receive their input data in a more natural way. By teaching computers to perceive the environment through sight, sound, and touch, some researchers have achieved promising results. Unfortunately, very few useful products have been generated from this research, despite considerable effort and fanfare.

This patent discloses an invention that addresses problems that have existed in the field of recognition for some time. There are many important issues:

The recognition system must allow the developer to decide in any situation the important differentiating features of two items and weigh these features appropriately, item by item. This is called bias.

Many recognition problems involve multiple items in many patterns and sub-patterns (for example Chinese characters). Often subpatterns recur as part of many different objects. A recognition system should represent both this complex structure and the recurring components, using them to advantage in the development process as well as in the recognition process.

Recognition problems have traditionally been solved for one application problem at a time. The tendency in these cases has been to intermix application- or problem-specific steps with core recognition steps. By failing to maintain a barrier between the recognition tool and the application, developers have virtually always created recognition systems that can be applied to only one problem instance.

Recognition is a common problem across many domains. If the common part of the problem could be treated such that solutions could be used for many different problems, the key benefit would be that advancement or improvement in the core technology will immediately advance or improve all of its applications. Also, re-using the core technology eliminates the invention and re-invention of this aspect of the solution, so that resources can be applied to improving the process or applying it in new ways.

Recognition problems and our knowledge about them are always changing and evolving. New solutions must be quickly created and existing solutions must continually be changed and improved. The difficulty is that the problem is never fixed; it is a moving target. Therefore, solving the problem requires a dynamic system that can be modified and appended as the requirements change. Many recognition solutions have reached a premature dead-end when their technology proved too rigid to evolve.

If two tools are functionally equivalent, but one requires the developer to consider details that are not directly related to the problem, while the other tool elucidates the important issues of the problem while hiding the details, then the latter tool will be the most useful.

Recognition in its purest sense is a matter of matching the items in one pattern to the items in another. Simply put, objects to be recognized have attributes, and there are relationships between the objects. Any recognition system should structure descriptions of each object that makes explicit the individual items to be recognized, their attributes, and the relationships between them.

Recognition is an inherently computationally-intensive problem. At each step, the complexity of the recognition problem must be considered and dealt with in order to yield a time- and memory-efficient recognizer.

Previous systems have focused on one or another of these issues, but none represents a solution in all areas.

DISCLOSURE OF THE INVENTION

This invention reveals a unique and powerful tool for creating recognizers and doing recognition, one that addresses each of these issues. Therefore:

It is an object of this invention to provide a recognition system that can have variable bias, stronger in complex ambiguous cases, weaker in less ambiguous cases.

It is another object of the invention to provide a tool that allows developers to create new recognizers and modify existing ones with great power and relative ease.

It is another object of the invention to provide a generic tool that can be used to create recognizers for many different applications.

It is another object of this invention to provide a recognition system that clearly modularizes the generic recognition system from the application-specific information.

It is another object of this invention to provide a system that allows the developer of a recognizer to focus on his or her specific recognition issues while hiding the details of the implementation.

It is another object of this invention to provide a recognition system that represents and makes extensive use of a hierarchical, object-centered representation.

It is another object of this invention to provide a recognition system that represents and recognizes complex structures in an object and takes advantage of frequently-occurring patterns in this structure.

It is another object of this invention to provide a system for creating computationally-efficient recognizers.

BRIEF DESCRIPTION OF THE DRAWINGS

FIG. 4 illustrates data structures within the recognition system.

DETAILED DESCRIPTION OF A PREFERRED EMBODIMENT OF THE INVENTION

Figure 1:
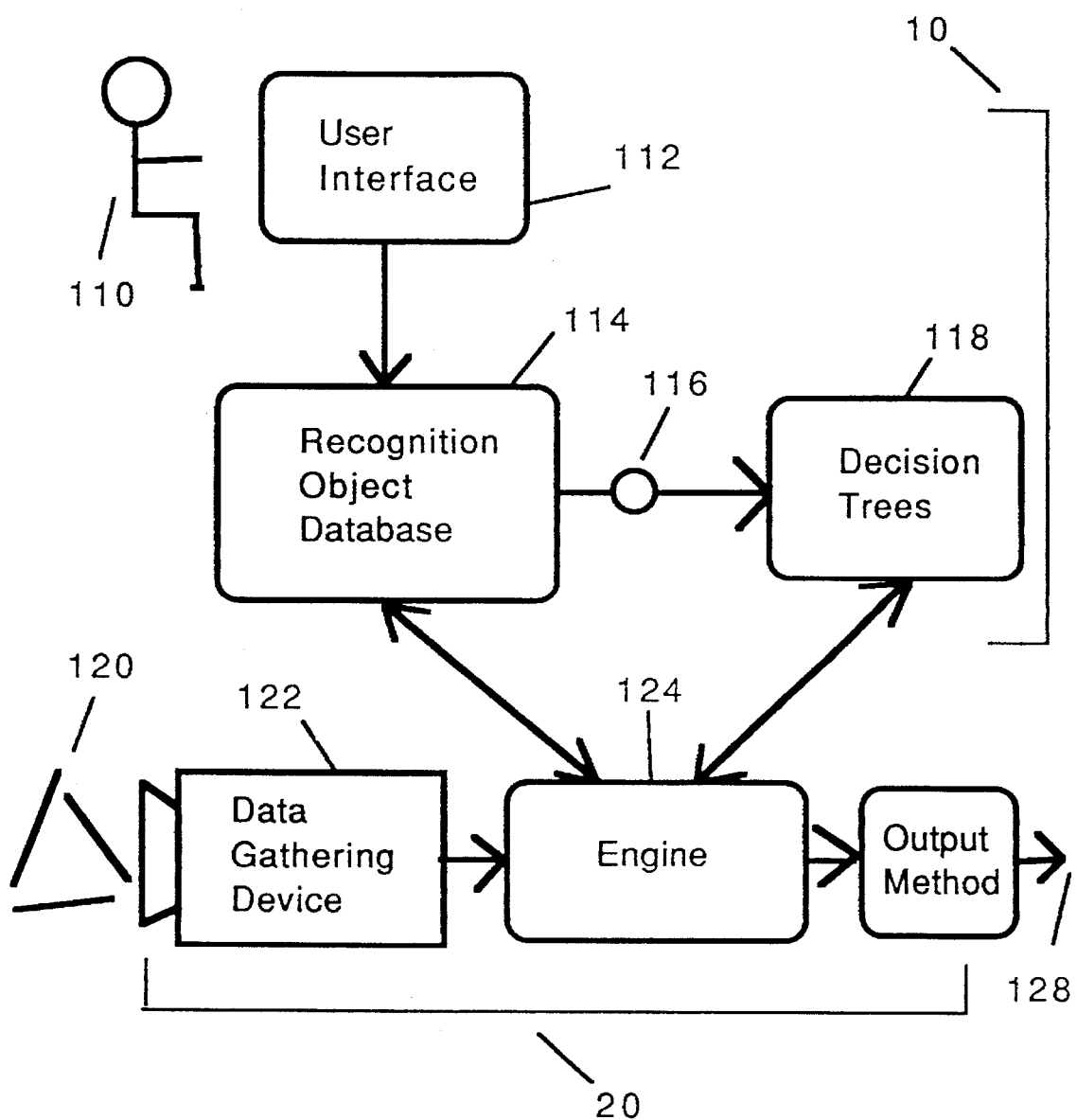
FIG. 1 is a block diagram of a recognition system embodying the present invention.

Briefly described, and in accordance with one embodiment thereof, the invention provides a recognition system, as shown in FIG. 1, that is comprised of two major subsystems operating in a general purpose computer: a development subsystem (10) and a production subsystem (20). The development subsystem is used to create a standalone, modular recognizer capable of being integrated with many operating systems and computer languages, using well known techniques. The production subsystem executes the actual recognition method. By using the development subsystem, a developer can modify the behavior and results of the recognition method.

Together the development subsystem and the production subsystem comprise a total environment for creating recognizers and executing recognition.

In the following text the term developer refers to a person who is creating a new recognizer.

Figure 2A:
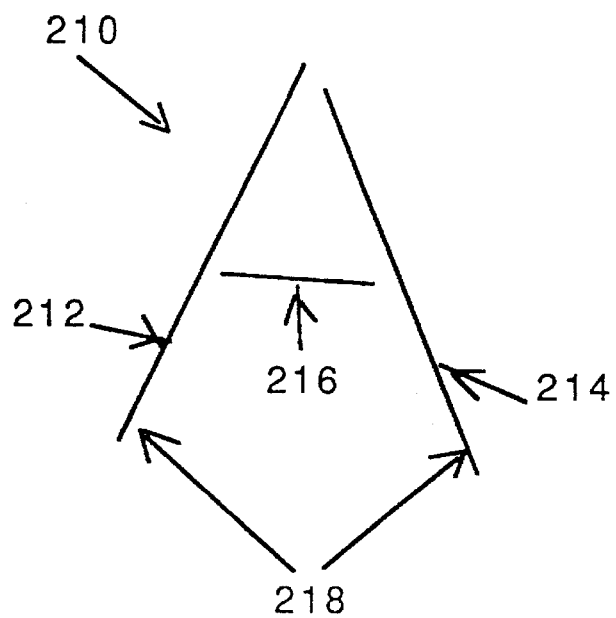
FIG. 2A illustrates input entities forming a letter A.
Figure 2B:
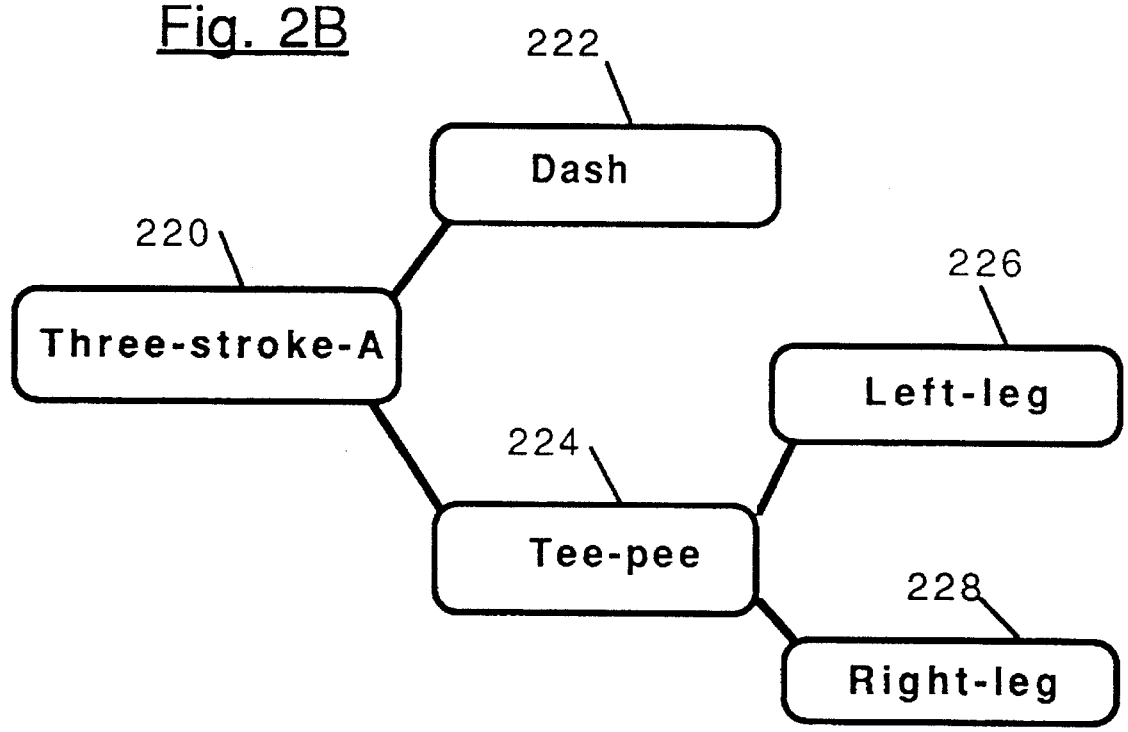
FIG. 2B illustrates a recognition object tree for the letter A of FIG. 2A.
Figure 3A:
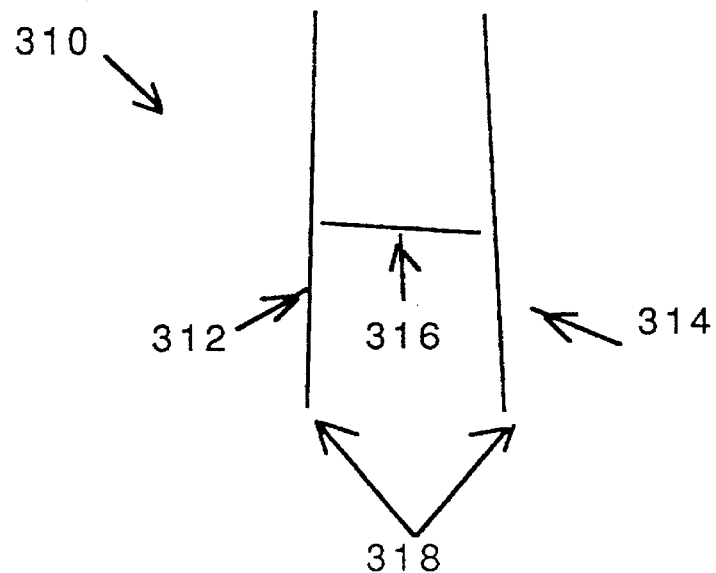
FIG. 3A illustrates input entities forming the letter H.
Figure 3B:
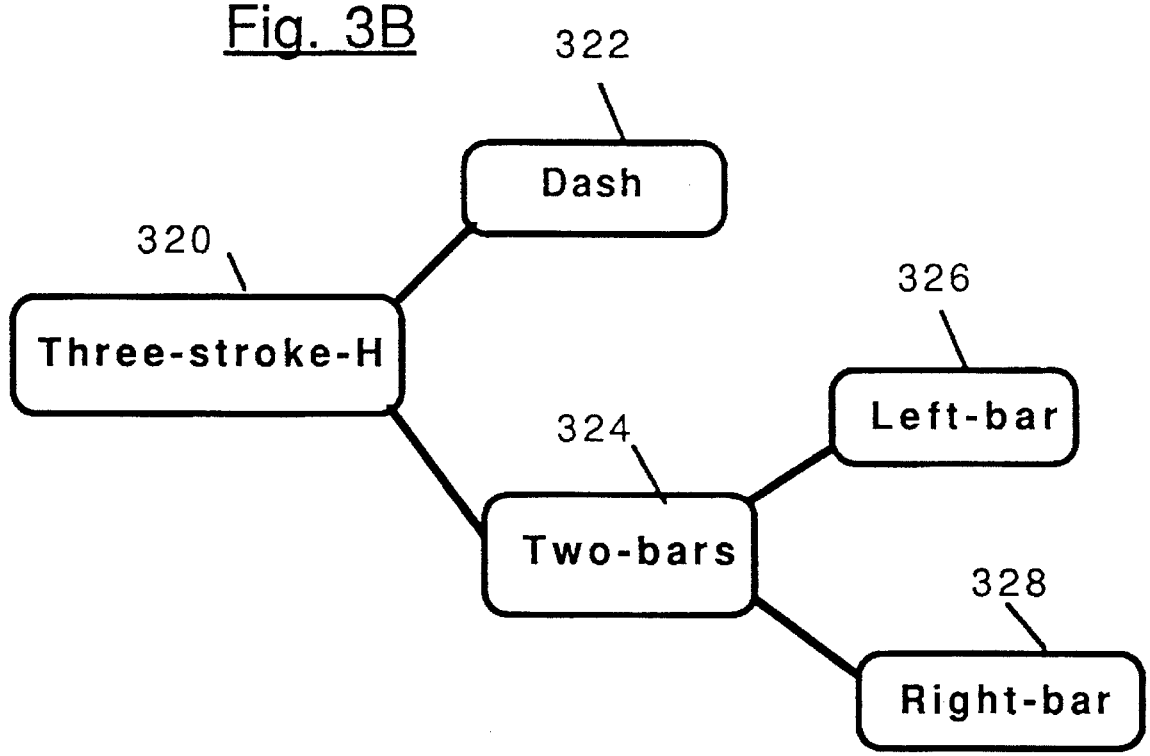
FIG. 3B is a recognition object tree for the letter H of FIG. 3A.

Within the development system, objects to be recognized are represented in an object-centered hierarchical way as shown in FIG. 2 and FIG. 3. The developer creates and manipulates these objects, called recognition-objects, to fit the specific recognition application that he or she has in mind. In the simple example case (FIG. 2, from the domain of character recognition), the recognition-objects are left-leg (212,226), right-leg (214,228), tee-pee (218,224), dash (216, 222), and Three-stroke-A (216,220). Similarly, from FIG. 3, the recognition objects are left bar (312), (326), right bar (314,328), two bars (318,324), dash (316,322) and Three-stroke-H (310,320).

Each recognition-object has a set of predicates. Predicates are tests that are used to confirm (true or false) whether or not the raw data includes an instance of the recognition-object. For example, the left-leg recognition-object (226) has a predicate that checks to see if the stroke is down and to the left. It has another predicate that checks to see if the stroke is straight.

Binary predicates can also be used. A binary predicate is a test that involves two input entities. For example, in the tee-pee recognition-object (224) there is a binary-predicate that tests whether the top of one input entity, the left-leg (226), is close to the top of a second entity, the right-leg object (228).

Recognition-objects also have children. The parent-child relationship of recognition-objects defines the recognition-tree. For example, the tee-pee recognition object (224) has two children, the left-leg (226) and the right-leg (228).

At the root of the recognition-tree are the root descriptions of symbols, letters, or numerals to recognize. Three-stroke-A is the root of the recognition-tree in our example.

Referring again to FIG. 1, the development subsystem comprises the User-Interface means (112), a memory means with access methods known as the recognition-object-database (114) that stores recognition trees; and a Generate method (116) that creates a second kind of tree, a decision tree (118). Each decision tree node contains a recognition-object, a true branch, and a false branch.

It should be realized that the invention is applicable to the identification of patterns in any type of raw data wherein the input data (120) can be organized into input-entities that have interesting testable features in the individual entities and interesting testable relationships between the entities. For example, in the domain of on-line recognition of pen-input, the input data are sequential x-y coordinates organized into strokes, in this case the input-entities. Furthermore, the data-gathering device described here may be embodied in a number of suitable hardware or software forms such as special-purpose circuitry or computer instructions.

The engine method (124) receives its input entities from the data-gathering-device (122). The input-entities are added to a working database called the discovered-item-database. Then the engine method starts at the root of the decision tree and tests for the existence of the recognition-object associated with that decision-tree node in the input data. It does this by executing each of the predicates for that recognition object against each of the input-entities. If, for any input-entity, the result of all the tests is true, then the engine method adds a new recognition-object instance to the discovered-item-database and goes to the true-branch; otherwise it goes to the false-branch. The method is repeated until an answer is reached. With each repetition predicates for the recognition object are tested against input entities and previously identified recognition object instances which are in the discovered-item-database.

The new recognition-object instances that are added to the discovered-item-database represent a mapping from recognition-objects to input-entities and other discovered-items. Because the relationships are identical to those in the recognition-trees, the effect is to rebuild the recognition-trees from the leaves back toward the root until an answer is found.

After an answer is found, an application-specific output method (126) uses the answer, a mapping from recognition-objects to input-entities contained in the discovered-item-database, to calculate appropriate outputs (128). These outputs can be a computer code such as an ASCII code for letters, or a name for the symbol, a location, an orientation, a scale, and other possible answers.

Some data structures are now described.

Recognition Objects

FIG. 4 shows that the principal data type on which the development subsystem of the recognition apparatus will operate is the recognition-object (410). Recognition-object is a data structure which is capable of storing the following data:

- Name—A name slot is a unique identifier, usually in the form of a mnemonic character string. For example, "Three-Stroke-A".
- Properties—A properties slot is a collection of pairs. The first item of each pair is the name of the property, the second item is a value. Each property name must be unique to each recognition-object. The value of a property is a number, a name, or a text-string. For example, properties may include an interpretation that is passed on to the output routine, such as "A," indicating that the answer is an A.
- Predicates—A predicates slot is a collection of pairs. The first item of each pair is a predicate name, and the second item is a predicate-object. The predicate-object specifies the name of a predicate test function and its inputs. For example the Left-leg recognition-object has an absolute-direction predicate that tests to see that the direction of the left-leg is down and to the left.
- Children—A children slot is a collection of zero, one, or two child-objects. Referring to FIG. 4 a child-object (412) has two slots: name and type. The name must be unique within the recognition-object. The type is the name of another recognition-object. For example, the Three-Stroke-A recognition-object (220) has children Tee-Pee (224) and Dash (222).
- Fence-objects—A fence-objects slot contains a collection of recognition-object names, selected to help assure maximum recognition confidence levels by preventing premature determinations. These are objects that may be ambiguous or confused with the current recognition-object. For example, by including Bar in the Fence-objects collection of Left-leg, the system is notified not to make a final determination about the existence or non-existence of Three-Stroke-A based on the existence of Bar. This is necessitated by the fact that the definitions of Bar and Left-Leg necessarily overlap.
- Context-keys—A symbolic reference that is used as a key for storage and retrieval in the recognition object database.

A set of example recognition-objects is shown in Appendix 1.

Predicate Objects

Predicate objects contain the data necessary to call a predicate (test) function.

Referring to FIG. 4, item 414, it is shown that a predicate-object is a data type comprised of a predicate-function-name, reference to one or two name-chains, and a collection of input-specifications. The predicate-function-name indicates one out of a predefined set of several functions. This is an important restriction since it enables the system to execute the predicates by dispatching on the function name and therefore does not require a compiling step during the engine procedure. Also, the entire predicate can be compactly stored as a number indicating the function name and a set of numbers indicating the input values.

A name-chain is a series of child-object names. The child-object names indicate a path down through the tree to (he leaf of choice. This is necessary since all predicates must be applied to input entities and the leaf nodes map directly to input entities.

Two types of predicates can be used in this system, unary and binary. An unary predicate operates on only one input-entity. A binary predicate operates on two input-entities. Unary predicates require one name-chain, a binary predicate two.

For example, referring to FIG. 2 item 220, the Three-stroke-A recognition-object could have a predicate-object like this:
Predicate-object[
 function-name Distance-from-line-?
 distance 25
 U-1-1 0
 U-1-2 100
 U-2-1 0
 Ref-1 (Tee-pee Right-leg)
 Ref-2 (Dash))]

The indicated predicate function is Distance-from-line?. This predicate test is true if the line segment between the points at U-1-1 and U-1-2 on the input entity indicated by Ref-1 is within deviation of the point at U-2-1 on the input entity indicated by Ref-2.

The distance value, 25, indicates the allowed distance between the line and the point as a percent of the length of the first stroke. Expressing this distance as a percent allows the recognition to be scale invariant. As described below, the U values indicate points on the strokes as a percent along the stroke. For example, U-1-1 is 0, the start-point of stroke 1 and U-1-2 is 100, the end-point. Ref-1 and Ref-2 indicate which leaf objects the test function should be applied to.

Recognition Tree

Complex objects are represented by several recognition-objects. The parent child relationships of the recognition-objects defines a hierarchical tree structure, which is referred to as a recognition-tree. For example, in FIG. 2B the leaves of the recognition-tree (222, 226, 228) correspond to the input-entities. The root of the recognition-tree (220) represents the goal object to be recognized. The internal nodes organize the structure of the object.

Recognition Object Database

Referring to FIG. 1, the recognition-object-database (114) is comprised of a collection of all recognition-objects and a means for accessing that collection.

Decision-tree-node

Figure 12:
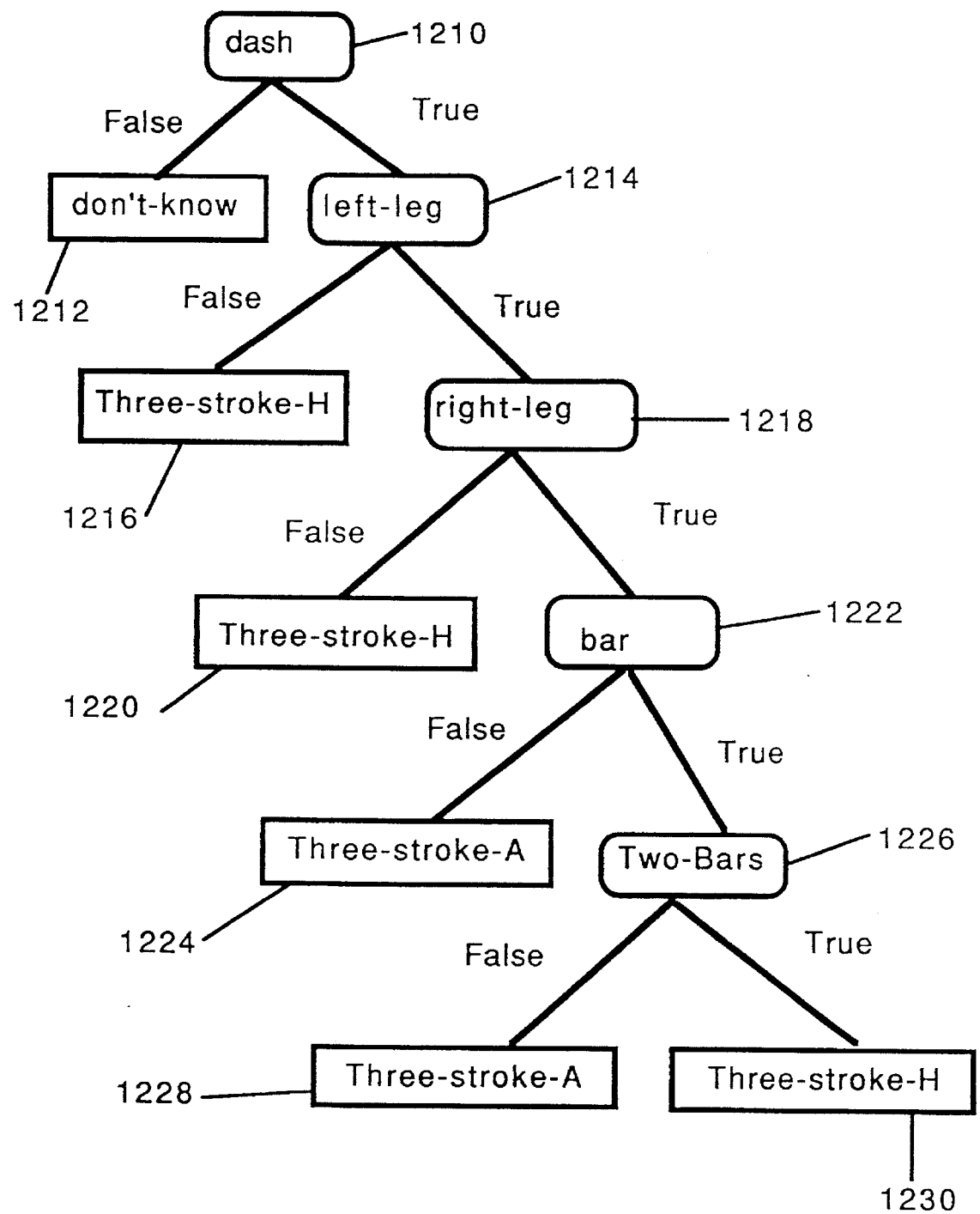
FIG. 12 is a decision tree for recognizing the letters A and H in the claims.

Referring to FIG. 4 item 418, a decision-tree-node data structure has three slots: a test, a true-branch, and a false-branch. The test is a recognition-object; each branch either drops down to another decision-tree-node or is an answer. An example decision tree is shown in FIG. 12.

Raw-root-map

The raw-root-map groups recognition-trees according to the number of leaves by mapping from each quantity of input-entities (N) to the recognition-tree(s) that have (N) leaves. Each resulting group of recognition-trees all have the same number of leaves in their trees, an aspect that is important to the recognition method.

Root-map

A decision tree is provided for each group defined by the raw-root-map. The root-map maps from the quantity of input-entities (N) to the root decision-tree-node for the decision-tree for (N) input-entities.

Generate Method

Up to this point only data structures and utility methods have been described. This section begins the description of the methods. Referring to FIG. 1, it is seen that the generate-method (116) takes input from the recognition-object-database (114) and ultimately creates decision-trees (118).

The generate method simply collects the appropriate recognition-trees from the database, classifies them by the number of leaves in the tree, and passes each collection on to the Generate-1 method, which will actually calculate the individual decision trees.

Figure 5:
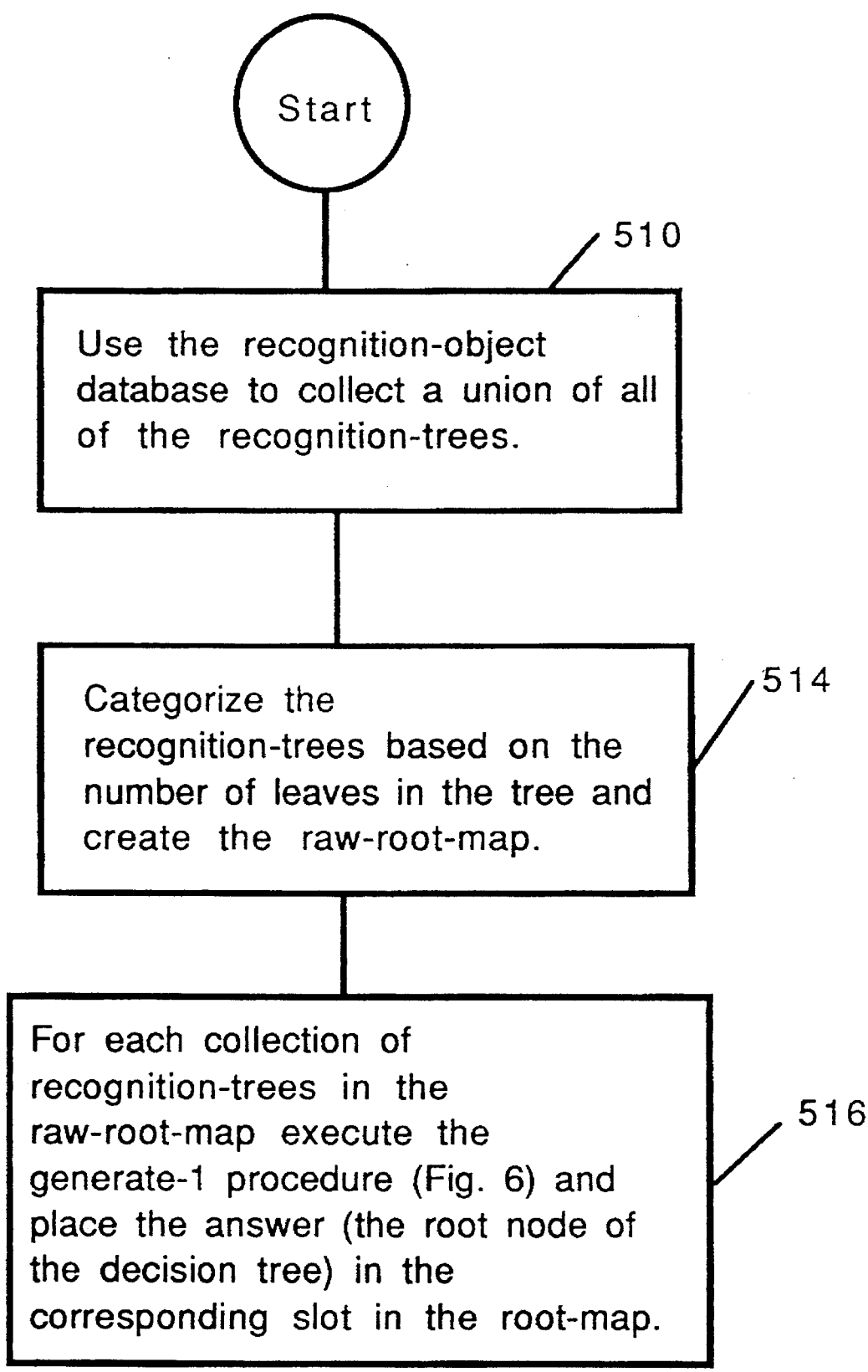
FIG. 5 is a flow chart illustrating generation of a decision tree from recognition object trees.

There are shown various steps of the Generate method of the invention in the flowchart of FIG. 5. Each of these steps is described in detail.

In step 510 the recognition-trees are collected from the recognition-object database.

In step 514 each of the recognition-trees is categorized according to the number of leaves in the tree. The result is the raw-root-map.

In step 516 for each collection of recognition-trees in the raw-root-map the generate-1 method is executed and the resulting answer (the root node of a decision tree) is placed in the corresponding slot in the root-map.

For example, assuming that the recognition object database includes the definitions of Three-Stroke-A and Three-Stroke-H as shown in Appendix 1, the following steps would occur within the Generate method.

In step 510 the recognition-object-database is used to determine that there are two recognition-trees that must be differentiated within the recognizer:

Three-stroke-A and Three-stroke-H.

In step 514 both Three-stroke-A and Three-stroke-H are classified in the raw-root-map as three-leaf objects.

In step 516 the Generate-1 method is called to generate a decision tree with the collection of two recognition-trees as an argument. The result is placed in the root-map.

Generate-1 Method

Generate-1 is a recursive method that creates a decision-tree from a collection of recognition-trees. The decision tree includes, at each decision node, a recognition object found within the recognition object database. In later applying the decision tree to input data, the engine, at each decision tree node, tests whether the object of the nod is within the discovered-item-database. The results of those tests through the decision tree determine which of the goal recognition objects are defined by the input data.

The Generate-1 method will now be described in detail, followed by a detailed application of the method to the example recognition trees of FIGS. 2 and 3.

When called with a collection of recognition trees Generate-1 picks a leaf recognition-object as a "Candidate-test" object and then sifts the recognition-trees. A recognition-tree is sifted into the True collection if the existence of an instance of the Candidate-test object in the input data is consistent with the possible existence of the recognition-tree. A recognition-tree is sifted into the False collection if the existence of a Candidate-test instance in the input data is not consistent with the possible existence of the recognition-tree. After the sifting process the Candidate-test object is removed from the True recognition-trees. Then a decision tree node is made: the test item of the decision-tree node is the Candidate-test object. The true and false branches from each decision tree node come from the result of recursively calling the Generate-1 method using the True and False collections as input. Specifically, after creation of a decision tree node, the true and false collections are separately processed through the Generate-1 method. Within the true collections the recognition trees are revised by removing the recognition-object just included in the decision tree node. Within each the leaves of the recognition trees (revised in the true collection) are again identified, sifted, and one of the leaves is selected as a test and decision tree object. all trees in the collection are sifted into true and false collections for that node. Those collections are separately processed through the Generated method and so on. The final result is a decision tree, an example of which is shown in FIG. 12.

Figure 6:
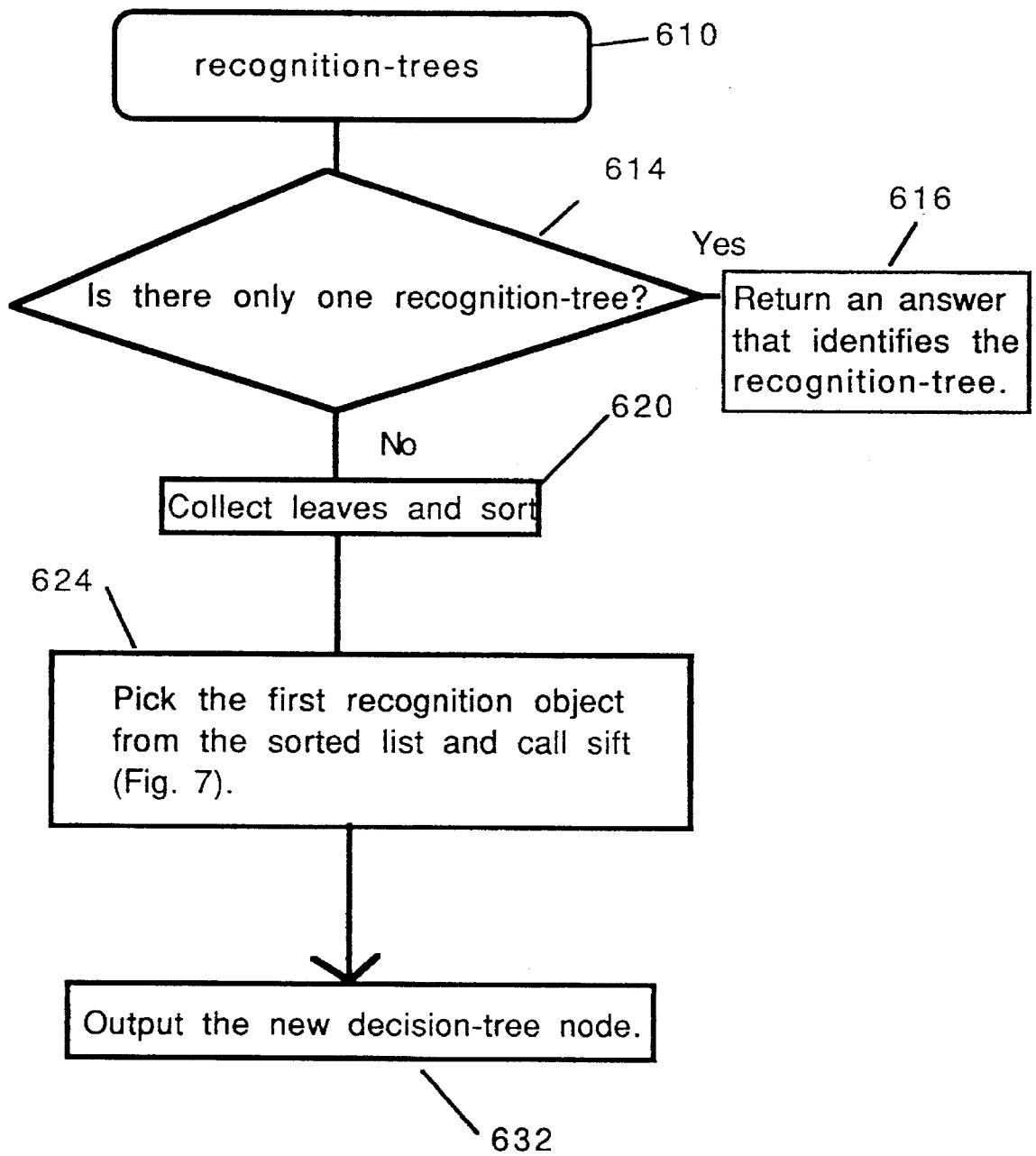
FIG. 6 is a flow chart for the generate-one procedure indicated in FIG. 5.

Referring to the flowchart of FIG. 6 there are shown various steps of the generate-1 method of the invention. Each of these steps is described in detail.

In step 610 it is shown that the input to the generate-1 method is a collection of recognition-trees.

In step 614 the collection of recognition-trees is tested to see if there is only one. If the test is true the method is done and an answer that identifies the recognition-tree is returned (616). If the test is false the method continues with step 620.

In step 620 a new single collection of all of the leaf recognition-objects is created from the leaves of the recognition-trees and they are sorted. The sorting is based on the number of leaves in the recognition-tree defined by each recognition-object. Objects that have fewer leaves come first. For example, the leaves of the recognition tree Three-stroke-A (FIG. 2B) are Dash, Left-leg, and Right-leg. Since all of them represent only one leaf of this original tree they could be sorted in any order. Later, after several recursive calls to Generate-1, some of the leaves of the original tree may have been removed. One possible form of the new tree might be:

Three-stroke-A

Dash

Tee-pee

This new tree is the result of removing the Left-leg and Right-leg nodes from the original tree. In this case the collection of leaves would yield: Dash and Tee-pee. And the sort would put Dash before Tee-pee because it represented, in the original tree structure only one leaf, while the original form of Tee-pee had two leaves.

Since each recognition-object represents a matching and since the computational complexity of the recognition is determined by the number of leaves involved, this test insures that the engine method makes determinations based on easier-to-compute matching operations first and on more time-consuming matching operations later, and only if necessary. Also, it is a requirement to find the child objects first before finding a parent object. Since parent objects will always have leaves, the selection of only leaves assures this order. For example, it is necessary to find a Left-Leg (226) and a Right-Leg (228) before finding a Tee-Pee (224).

In step 624 the first object from the sorted list and the collection of recognition trees is used as input to the sift method. The new decision node is returned.

Sift

The purpose of the sift method is to determine for each recognition-tree whether it should continue to be considered as a possible goal object in the hypothetical case that an instance of the candidate object is later found in the input-data. If it should continue to be considered, it is added to the true branch collection, otherwise it is added to the false branch collection. In ambiguous cases it is added to both. Finally, a new decision-tree node is returned.

Figure 7:
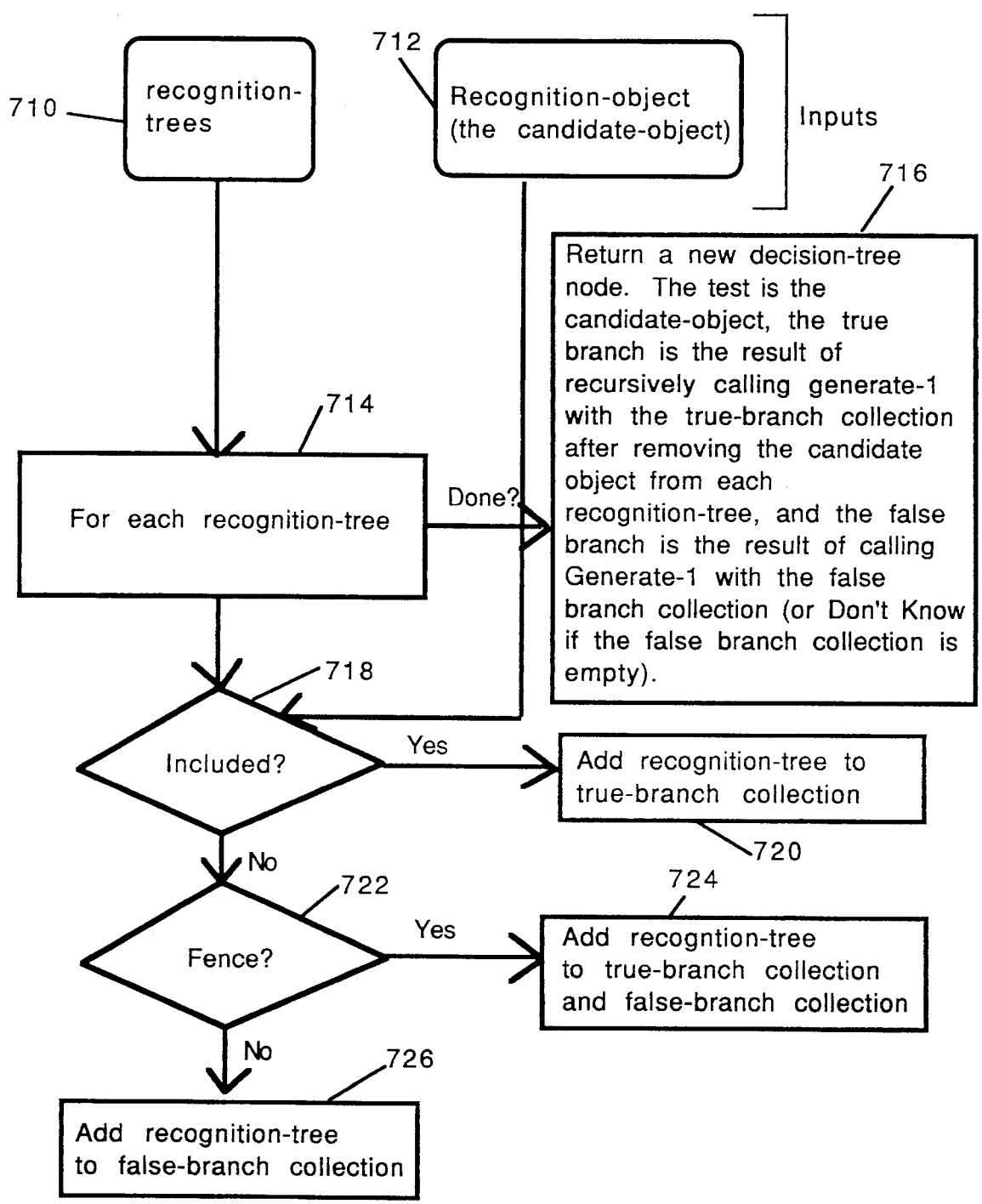
FIG. 7 is a flow chart for the sift procedure identified in FIG. 6.

Referring to the flowchart of FIG. 7 there are shown various steps of the sift method of the invention. Each of these steps is described in detail.

In step 710 and 712 it is shown that the inputs to the sift method are a collection of recognition-trees and a single recognition-object, which is retained throughout the sift method (the candidate-object).

In step 714 it is shown that the method iterates for each recognition-tree in the collection of recognition-trees.

In step 716 it is shown that when the iteration is complete, the method returns the following:
A decision-tree-node
  the test is the candidate-test object.
  the true branch is the result of removing the candidate-test object from the true branch collection and using the resulting collection as an argument for a recursive call to generate-1. Eventually this recursive call of generate-1 will return another decision-tree node or an answer.
  the false branch is the result of recursively executing the generate-1 method using the false-branch collection as an argument. Or, if the false branch collection is empty a "Don't Know" answer is used.

In step 718 an included? method is performed. For each leaf recognition-object of each recognition-tree the leaf object is tested against the test-object using a recognition-object-equal method. This methods determines that two recognition-objects (A and B) are equal if all aspects of A are the same as for B, in other words they represent the same data. If this test is true for any leaf recognition-object, then the recognition-tree containing that object is included in the true-branch collection (step 720).

In step 722 a fence? method is performed. If any of the recognition objects of a recognition-tree has a fence-object that is equal to the test-object, then the recognition-tree is included at 724 in both the true and false branch collections.

In step 726 it is shown that if the tests of steps 718 and 722 were false then the recognition-tree is included in the false collection.

For example, the result of calling the Generate-1 method on Three-Stroke-H and Three-Stroke-A is the decision tree as shown in FIG. 12. Referring to FIG. 6 and FIG. 7:

In step 614 the collection of recognition-trees is tested and it is found to have two recognition-trees, so execution continues at step 620.

In step 620 the leaf recognition-objects are sorted, yielding:
 (Dash
 Left-leg
 Right-leg
 Left-bar
 Right-bar)

In step 624 the Dash recognition-object is selected as the candidate-test object;
and the sift method of FIG. 7 is executed.

In step 714 it is shown that each recognition tree is selected one at a time.

First the Three-Stroke-A is selected and step 718 is executed. Since Dash is included in Three-Stroke-A it is added to the true-branch collection.

Next Three-Stroke-H is selected and step 718 is executed. Since Dash is included in Three-Stroke-H it is added to the true-branch collection.

Finally step 716 is executed and the following decision-tree-node is created:

| Decision-tree-node[ | |
|---|---|
| TEST | Dash |
| TRUE-BRANCH | <Result of calling generate-1 recursively with the new true-branch collection after removing Dash from the recognition-trees> |
| FALSE-BRANCH | <Don't know>] |

This is item 1210 in FIG. 12.

In step 632 the new decision-tree-node is returned.

Within the Sift method the Generate-1 method was called recursively with the following trees as input (the Dash objects removed):

Three-stroke-A
 Tee-Pee
 Left-leg
 Right-leg
 Three-stroke-H
 Two-Bars
 Left-bar
 Right-bar In step 620 the leaf recognition-objects are sorted, yielding:
 (Left-leg
 Right-leg
 Left-bar
 Right-bar)

In step 624 the Left-leg recognition-object is selected as the candidate-test object.
and the sift method is executed.

In step 714 it is shown that each recognition tree is selected one at a time.

First the Three-Stroke-A is selected and step 718 is executed. Since Left-Leg is included in Three-Stroke-A it is added to the true-branch collection.

Next Three-Stroke-H is selected and step 718 is executed. Since Left-Leg is not included in Three-Stroke-H, execution is continued at step 722.

In step 722 it is found that the Left-leg is included in the fence-objects list of bar, so Three-Stroke-H is added to both the true-branch collection and the false-branch collection.

Finally step 716 is executed and the following decision-tree-node is created:

| Decision-tree-node[ | |
|---|---|
| TEST | Left-Leg |
| TRUE-BRANCH | <Result of calling generate-1 recursively with the new true-branch collection after removing Left-Leg from the recognition-trees> |
| FALSE-BRANCH | <Don't know>} |

This is item 1214 in FIG. 12.

Note that even though Three-stroke-H does not include a left-leg it does include left-leg in the fence-objects list. The developer placed left-leg in the fence-objects list because some writers slant their H's, potentially causing confusion with A. Therefore, it can not be determined whether or not Three-stroke-H exists based on the test for Left-leg. In this case, the Three-stroke-H must fall in both the True-branch-collection and the False-branch-collection.

On entry to step 614, with the false-branch collection which has the single entry Three-Stroke-H, the collection contains only one recognition-tree, so execution goes to step 616 and the answer value of Three-stroke-H is returned. This is item 1216 of FIG. 12.

At the time of creation of decision node 1214, the Generate-1 method was called recursively with the following trees as input:

> Three-stroke-A
> Tee-Pee
> Right-leg
> Three-stroke-H
> Two-Bars
> Left-bar
> Right-bar In step 620 the leaf recognition-objects are sorted, yielding:

(Right-leg

Left-bar

Right-bar)

In step 624 the Right-leg recognition-object is selected as the candidate-test object.
and the sift method is executed.

In step 714 it is shown that each recognition tree is selected one at a time.

First the Three-Stroke-A is selected and step 718 is executed. Since Right-Leg is included in Three-Stroke-A it is added to the true-branch collection.

Next Three-Stroke-H is selected and step 718 is executed. Since Right-Leg is not included in Three-Stroke-H, execution is continued at step 722.

In step 722 it is found that the Right-leg is included in the fence-objects list of bar, so Three-Stroke-H is added to both the true-branch collection and the false-branch collection.

Finally step 716 is executed and the following decision-tree-node is created:

| Decision-tree-node[ | |
|---|---|
| TEST | Right-Leg |
| TRUE-BRANCH | <Result of calling generate-1 recursively with the new true-branch collection after removing Right-Leg from the recognition-trees> |
| FALSE-BRANCH | <Don't know>} |

This is item 1218 in FIG. 12.

Since only the Three-stroke-H is included in the false-branch collection for node 1218, it is the only item in the set of recognition-trees when Generated is called to create node 1220. Therefore the answer Three-stroke-H is returned.

When the Generate-1 method is called to create node 1222, the set of recognition trees contains both Three-stroke-A and Three-stroke-H. The recognition-object Bar is selected as the candidate object. Since Bar is part of Three-stroke-H, the Three-streoke-H is included in the true-branch set. And since bar is in the fence set for Three-stroke-A, the Three-stroke-A is included in both sets.

Following the false branch of node 1222, the Generate-1 is called with the single recognition-tree Three-stroke-A, so it is returned as the answer. Following the true branch of node 1222, the Generate-1 method is again called with both the Three-stroke-H and the Three-stroke-A. In this case the leaves of these trees are Tee-Pee and Two-bars. Two-bars is selected as the candidate-object. Since Three-stroke-A does not include Two-bars, it is sorted to the false collection and results in the answer node 1228. And since Two-bars is included in the Three-stroke-H it is included in the true-branch collection and results in the node 1230.

THE ENGINE METHOD

Additional Data Structures

The engine method examines a set of input data to be recognized, retrieves the appropriate decision tree, and executes the decision tree. The decision-tree has a recognition-object test at each node. If the predicate tests associated with the recognition-object are true when applied to the input data (an instance of the recognition object is found), then a record of the newly found and identified entity is stored in the discovered-item-database. The process is continued until the decision tree yields an answer. By adding a record of each found recognition-object to the discovered-item-database the recognition trees are effectively rebuilt from the leaves up.

The data structures and methods that are used in the engine method are described next.

Referring to FIG. 4, item 420, note that a discovered-item is a data structure that identifies input entities or maps recognition-objects to input-entities or previously discovered recognition objects (discovered-items). A discovered-item contains the following:

Recognition-object-name—This is the name of the recognition-object. For example, Left-Leg.

Input-entity-name—The input-entity-name is a pointer to the input entity that the discovered item is associated with (if it is directly associated with an input entity).

Child-1—This is the name of the discovered-item that is the first child of the recognition-object. (If the recognition object is a leaf, the Child-1 item will be a discovered-item which names an input entity.)

Child-2—This is the name of the discovered-item that is the second child of the recognition-object (if the recognition object is a leaf, the Child-2 item will be empty. Depending on the nature of the discovered items, a name will only be included for either the recognition object or input entity, not both.

The discovered-item-database is a collection of discovered-items.

Engine Method

Figure 8:
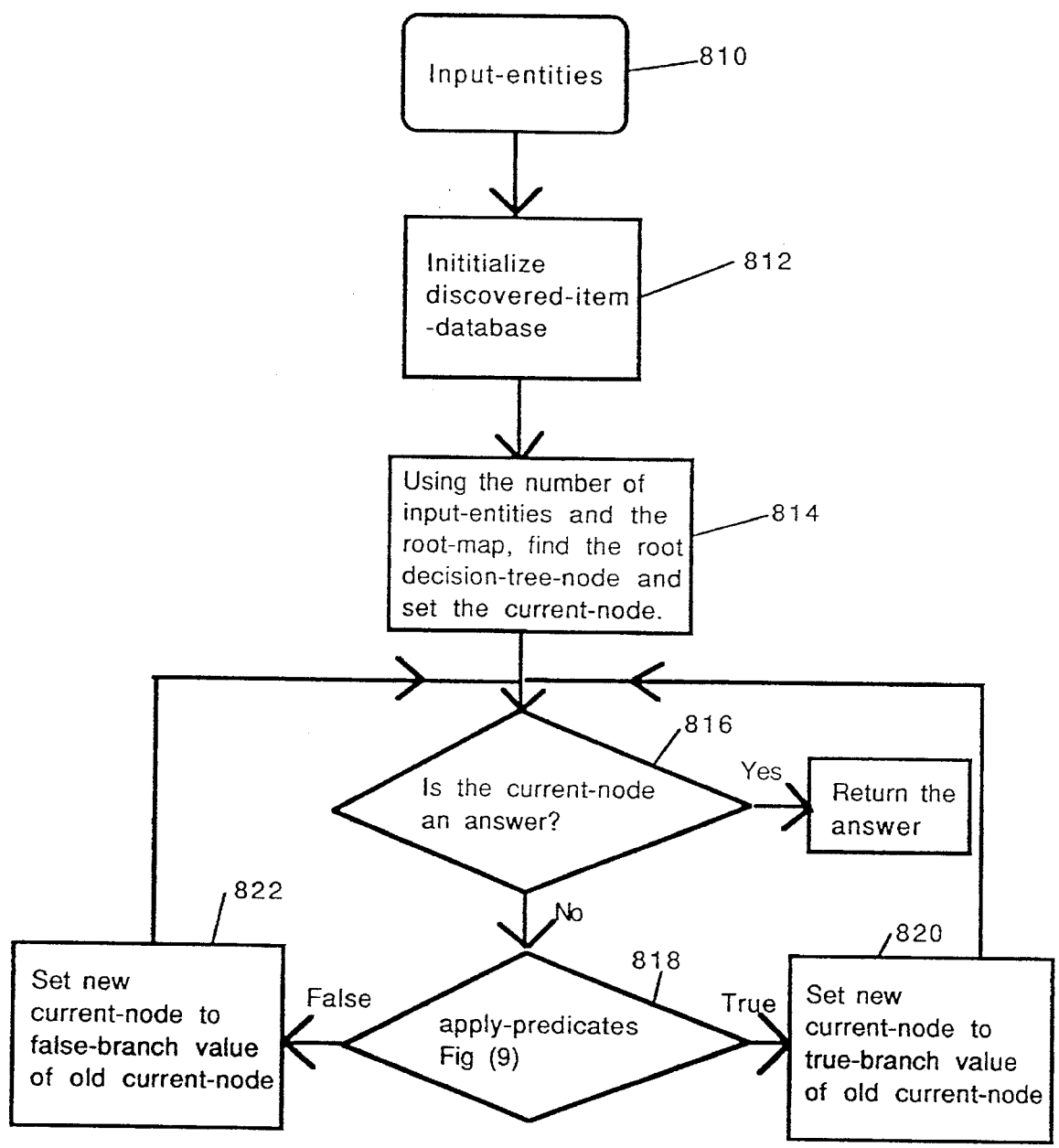
FIG. 8 is a flow chart for the engine of FIG. 1.

Referring to the flowchart of FIG. 8 there are shown various steps of the engine method of the invention. Each of these steps is described in detail. A detailed example follows the discussion of FIGS. 8, 9 and 10.

In step 810 it is shown that the engine method takes as input a collection of input-entities associated with a pattern, such as an alphanumeric character.

In step 812 the discovered-item-database is initialized with a discovered-item for each entity in the input set. These initial discovered-items have empty recognition-object-name slots.

In step 814 the quantity of input-entities is used as an index to retrieve the root of the decision-tree from the root-map. The value of a variable called the current-node is set to the root decision-tree-node.

In step 816 it is shown that if the current-node is an answer, execution is halted and the answer is returned. Otherwise execution is passed to step 818.

In step 818 the apply-predicates method is executed using the test recognition-object of the current-node as input. If the execution of apply-predicates returns true, execution is passed to step 820, otherwise it is passed to step 822.

In step 820 the current-node is set to the true-branch of the previous current-node and execution is returned to step 816.

In step 822 the current-node is set to the false-branch of the previous current-node and the execution is returned to step 816.

Apply Predicates

The apply predicates method takes a recognition-object of a decision tree node as input and applies the tests (predicates of the recognition object) to the input data to see if an instance of the recognition object appears in the input data. To that end, the system attempts to apply each predicate specification of the recognition object to each discovered item in the discovered-item-database. If the predicate requires two discovered items, then the predicate is applied to each combination of discovered items. Application of a predicate generally requires specific information about the input entity (such as a pen stroke), and that information is obtained from the discovered-item through the discovered item database.

If for any input entity all of the predicates apply, then the output of the decision tree node will be true, and the mapping (a discovered item) from the recognition object of the node to the input-entity or other discovered item can be added to the discovered-item-database for reference at subsequent decision tree nodes. (The mapping is in the form of a discovered-item.)

Figure 9:
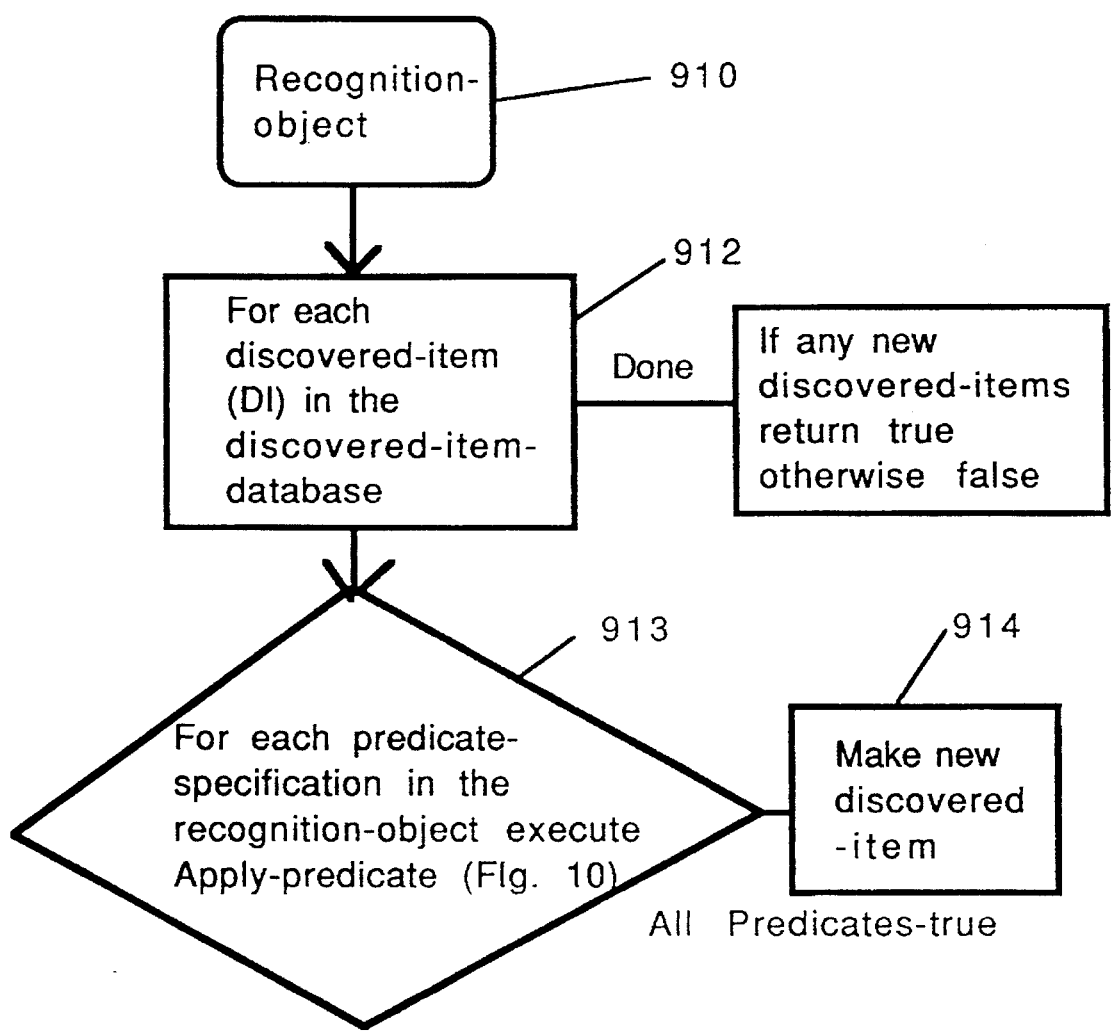
FIG. 9 is a flow chart for applying predicates in FIG. 8.

Referring to the flowchart of FIG. 9 there are shown various steps of the apply-predicates method of the invention. Each of these steps is described in detail.

In step 910 it is shown that the input to this method is a recognition-object.

In step 912 it is shown that for each discovered-item in the discovered-item-database, execution is passed to step 913. After the iteration is complete, execution is halted and a true condition is returned if any new discovered-items have been added to the discovered-item-database. Otherwise it returns a false condition.

In step 913 the apply-predicate method is executed for each of the predicate-specifications in the recognition-object. For unary predicates, it applies the predicate to each discovered-item and for binary-predicates it applies the predicate to every combination of pairs of discovered-items.

If for any discovered-item (or discovered-item pair) all of the calls to apply-predicate are true, then execution is passed to step 914.

In step 914 a new discovered-item is created with the form:

| Discovered-item | |
|---|---|
| name | The name of the test recognition-object |
| input-entity-name | <empty> |
| Child-1 | The first discovered-item. |
| Child-2 | The second discovered-item (if applicable) |
| Apply Predicate | |

The apply predicate method takes one predicate-object as input, finds the predicate function, evaluates the predicate input specifications, and executes the predicate function.

Figure 10:
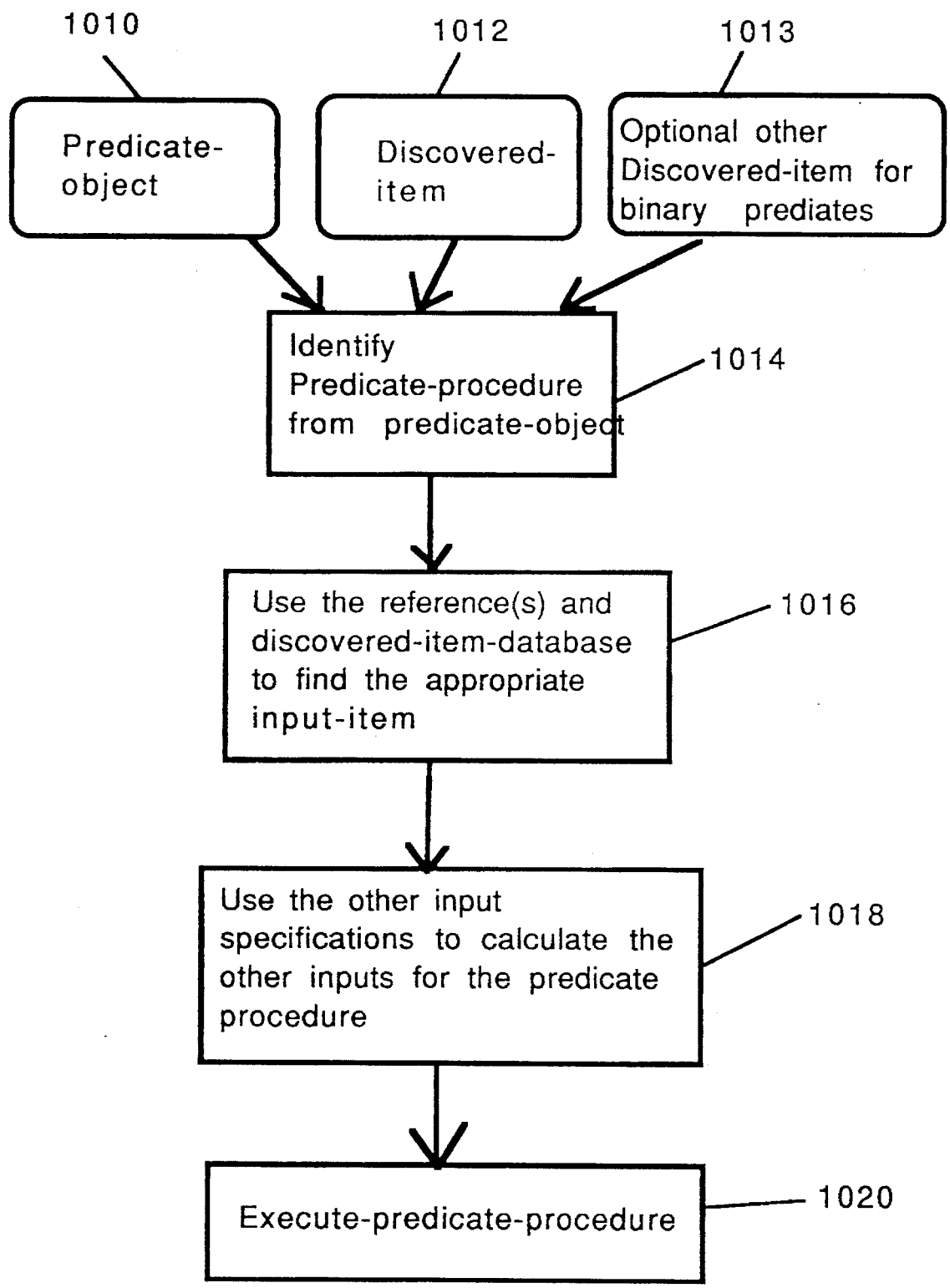
FIG. 10 is a flow chart for the apply-predicate procedure identified in FIG. 19.

Referring to the flowchart of FIG. 10 there are shown various steps of the apply-predicate method of the invention. Each of these steps is described in detail.

In steps 1010, 1012, and 1013 it is shown that the inputs are a predicate-object and a discovered-item.

In step 1014 the predicate-object is used to determine the predicate-method, the name-chain or name-chains, and other predicate argument specifications.

In step 1016 the name-chain or name-chains are used in conjunction with the discovered-item to identify the appropriate input-entity on which the rest of the arguments will be applied. This is done as follows:

Each discovered-item has an associated recognition-object. The first name in the name-chain is associated with either the first or second child-object of the recognition-object. If it is the first child-object, then the next discovered-item to examine is the one referred to in the Child-1 slot of the discovered-item.

Otherwise it is the one in the Child-2 slot of the discovered-item. The method is repeated until a discovered-item is found that is associated with an input-entity. An example is included in the Apply Predicate Example section.

In step 1018 the input-entity(ies) and the other predicate argument specifications are evaluated to determine the arguments to the predicate method.

In step 1020 the predicate method is executed and the result is returned as the answer.

Predicates

For any particular application field, the set of predicates and predicate-input-specifications will be different. A typical set of predicate-input-specifications and predicates is described here. This set is designed for recognizing handwritten characters from on-line pen input.

In this application area the input data is in the form of x-y coordinates and the input-entities are ordered collections of points called strokes. One stroke (represents) the locus of points traversed by the pen from the time it makes contact with the surface until it is lifted from the surface. One character may have one or more strokes.

These are the input specifications:
Vector
  This specifies a direction.
Percent-length
  This specifies a distance measure that is scale-independent, based on a percentage of the stroke length.
Integer
  This is a utility numerical input.
Angle
  This is an angle measure (in degrees for clarity).
U
  This specifies a point on the stroke based on a percent distance along the stroke.
(U Seg)
  This specifies a point on a stroke segment based on a percent distance along the segment. A stroke is divided into segments at its points of inflection in the curvature along the stroke.

These are the predicates:
accumulated-angle-less-p

| Arguments: | Type: |
|---|---|
| Rotation | angle |
| Segment | integer |

Function: Returns true if the accumulated-angle for Segment is less than Rotation. Otherwise returns false. For example a C might have an accumulated angle of 180 degrees while an O might have an accumulated angle of 360 degrees.

stroke-id-equal

| Arguments: | Type: |
|---|---|
| ID | integer |

Function: Returns true if ID is equal to the calculated stroke-ID. Otherwise returns false. The ID in this case is the number of inflections of curvature in the stroke. For example an S has one inflection because the curvature changes from left to right along the stroke.

absolute-direction-p

| Arguments: | Type: |
|---|---|
| Vect | Vector |
| U1 | U or (U Seg) |
| U2 | U or (U seg) |
| Deviation | angle |

Function: Returns true if the vector U1- to -U2 is within Deviation degrees of Vect. U1 is associated with name-chain-1 and U2 is associated with name-chain-2. If reference-2 is not provided then name-chain-1 is used for both. For example this predicate might be used to determine that the straight vertical stroke of the I shape is in fact vertical.

relative-distance-p

| Arguments: | Type: |
|---|---|
| U1 | U or (U seg) |
| U2 | U or (U seg) |
| Deviation | percent-length |

Function: Returns true if the point specified by U1 is within Deviation distance of the point specified by U2. For example, this predicate might be used to determine that the two side strokes of the Three-stroke-A begin at nearly the same location.

intersect-p

| Arguments: | Type: |
|---|---|
| U1-1 | U or (U seg) |
| U1-2 | U or (U seg) |
| U2-1 | U or (U seg) |
| U2-2 | U or (U seg) |

Function: Returns true if the line segment defined by the points U1-1 and U1-2 intersects the line-segment defined by U2-1 and U2-2. For example this predicate might be used to determine whether two strokes intersect to form an X.

absolute-distance-p

| Arguments: | Type: |
|---|---|
| U1 | U or (U seg) |
| U2 | U or (U seg) |
| Deviation | integer |

Function: Returns true if the point specified by U1 is within Deviation input units (usually screen pixels) distance from the point specified by U2. This predicate might be used to determine a punctuation character, like a period, by its absolute size.

same-p

No Arguments

Function: Returns true if the input-entity specified by name-chain-1 is the same entity specified by name-chain-2. (This predicate requires two name-chains)

distance-from-line-p

| Arguments: | Type: |
|---|---|
| Deviation | percent-length |
| U1 | U or (U seg) |
| U2 | U or (U seg) |
| U3 | U or (U seg) |

Function: Returns true if the point specified by U3 is within Deviation distance from the line-segment defined by the points U1 and U2. For example this predicate might be used to determine that the start point of the vertical stroke of a T shape is close to the line formed by the horizontal stroke.

relative-direction-p

| Arguments: | Type: |
|---|---|
| Name-chain | angle |
| Deviation | angle |
| U1-1 | U or (U seg) |
| U1-2 | U or (U seg) |
| U1-3 | U or (U seg) |
| U2-1 | U or (U seg) |

Function: Returns true if the angle defined by the vector from U1-1 to U1-2 and rotated in a clockwise direction by the angle Reference is within Deviation of the angle defined by the vector from U1-3 to U2-1. For example this predicate is used to determine the difference between a U and a V by measuring the relative angle between two sections of the crotch of the stroke.

An Engine Example

Figure 11:
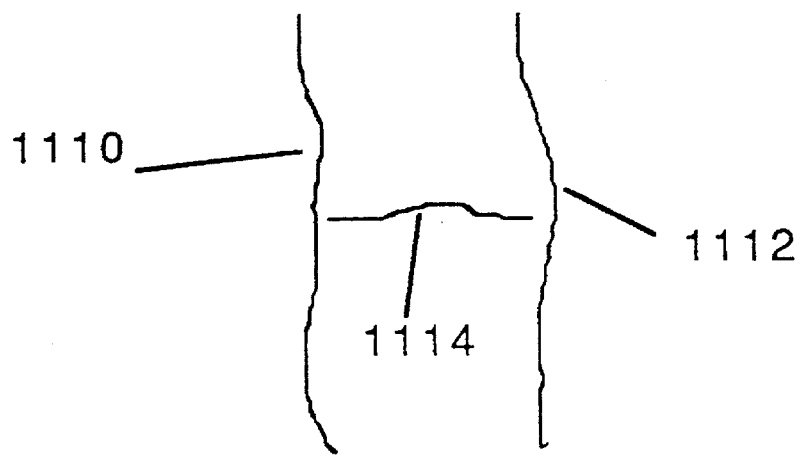
FIG. 11 is another illustration of the input entities forming the letter H.

Referring to FIG. 11, showing example input data and the Engine procedure as shown in FIG. 8.

In step 812 the discovered-item-database is initialized:

| | |
|---|---|
| Discovered-item-database[ | |
| DISCOVERED-ITEM-0 | |
|   Recognition-object-name | NULL |
|   Input-entity-name | ◇ |
|   Child-1 | ◇ |
|   Child-2 | ◇ |
| DISCOVERED-ITEM-1 | |
|   Recognition-object-name | ◇ |
|   Input-entity-name | 1110 |
|   Child-1 | ◇ |
|   Child-2 | ◇ |
| DISCOVERED-ITEM-2 | |
|   Recognition-object-name | ◇ |
|   Input-entity-name | 1112 |
|   Child-1 | ◇ |
|   Child-2 | ◇ |
| DISCOVERED-ITEM-3 | |
|   Recognition-object-name | ◇ |
|   Input-entity-name | 1114 |
|   Child-1 | ◇ |
|   Child-2 | ◇] |

In step 814 the decision-tree associated with the objects that have three input-entities is retrieved. An example is the decision tree shown in FIG. 12. The root of this tree is the dash node (1210).

In step 816 the dash node (1210) is not an answer node, so execution passes to step 818.

In step 818 the apply-predicates method is executed and a true condition is returned. The following discovered-item is added to the discovered-item-database:

| DISCOVERED-ITEM-4 | |
|---|---|
| Recognition-object-name | Dash |
| Input-entity-name | <> |
| Child-1 | DISCOVERED-ITEM-3 |
| Child-2 | <> |

In step 820 the current node is set to the left-leg node 1214 and execution continues at step 816.

In step 816 the left-leg node (1214) is not an answer node, so execution passes to step 818.

In step 818 the apply-predicates method is executed and a true condition is returned. The Left-leg item is add to the discovered-item-database:

| DISCOVERED-ITEM-5 | |
|---|---|
| Recognition-object-name | Left-leg |
| Input-entity-name | <> |
| Child-1 | DISCOVERED-ITEM-2 |
| Child-2 | <> |

In step 820 the current node is set to the right-leg node 1218 and execution continues as step 816.

In step 816 the right-leg node (1218) is not an answer node, so execution passes to step 818.

In step 818 the apply-predicates method is executed and a true condition is returned. The right-leg item is add to the discovered-item-database:

| DISCOVERED-ITEM-6 | |
|---|---|
| Recognition-object-name | Right-leg |
| Input-entity-name | <> |
| Child-1 | DISCOVERED-ITEM-1 |
| Child-2 | <> |

In step 820 the current node is set to the Bar node 1222 and execution continues as step 816.

In step 816 the bar node (1222) is not an answer node, so execution passes to step 818.

In step 818 the apply-predicates method is executed and a true condition is returned. The Bar-leg items are added to the discovered-item-database:

| DISCOVERED-ITEM-7 | |
|---|---|
| Recognition-object-name | Bar |
| Input-entity-name | <> |
| Child-1 | DISCOVERED-ITEM-1 |
| Child-2 | <> |
| DISCOVERED-ITEM-8 | |
| Recognition-object-name | Bar |
| Input-entity-name | <> |
| Child-1 | DISCOVERED-ITEM-2 |
| Child-2 | <> |

In step 820 the current node is set to the Two-Bars node 1226 and execution continues as step 816.

In step 816 the Two-Bars node (1226) is not an answer node, so execution passes to step 818.

In step 818 the apply-predicates method is executed and a True condition is returned. The Two-Bar item is added to the discovered-item-database:

| DISCOVERED-ITEM-9 | |
|---|---|
| Recognition-object-name | Two-Bars |
| Input-entity-name | <> |
| Child-1 | DISCOVERED-ITEM-7 |
| Child-2 | DISCOVERED-ITEM-8 |

In step 822 the current-node is set to the answer string Three-stroke-H and execution continues at step 816.

In step 816 the answer Three-stroke-H is detected and returned.

Apply Predicates Example

In the first steps of the above example, the Apply-predicates procedure was called with the dash recognition-object and with the state of the discovered-item-database as:

| Discovered-item-database[ | |
|---|---|
| DISCOVERED-ITEM-0 | |
| Recognition-object-name | NULL |
| Input-entity-name | <> |
| Child-1 | <> |
| Child-2 | <> |
| DISCOVERED-ITEM-1 | |
| Recognition-object-name | <> |
| Input-entity-name | 1110 |
| Child-1 | <> |
| Child-2 | <> |
| DISCOVERED-ITEM-2 | |
| Recognition-object-name | <> |
| Input-entity-name | 1112 |
| Child-1 | <> |
| Child-2 | <> |
| DISCOVERED-ITEM-3 | |
| Recognition-object-name | <> |
| Input-entity-name | 1114 |
| Child-1 | <> |
| Child-2 | <>] |

Referring to the flow chart for the Apply-predicates method in FIG. 9:

In step 912 an iteration occurs that executes step 913 for each discovered-item in the discovered-item-database.

When step 913 is executed with Discovered-item-0, Discovered-item-1, or Discovered-item-2, the value returned by apply-predicate is false for at least one of the predicates.

When step 913 is executed with Discovered-item-3, the value of each call to apply-predicate is true and execution is continued at step 914.

In step 914 a new discovered-item is added to the database.

Apply Predicate Example

In the above execution of Apply-predicates, the Apply-predicate procedure is called with the following two arguments:

| Predicate-object | |
|---|---|
| function-name | Absolute-direction |
| x 1 | |
| y 0 | |
| deviation 45 | |
| U-1 0 | |
| U-2 100 | |

| DISCOVERED-ITEM-3 | |
|---|---|
| Recognition-object-name | ◇ |
| Input-entity-name | 1114 |
| Child-1 | ◇ |
| Child-2 | ◇ |

Referring to the flow chart for apply-predicate in FIG. 10.

In step 1014 the predicate-function is identified as Absolute-direction.

In step 1016 it is noted that no name-chains are included, so the immediate discovered-item is used to find the input-entity for the predicate.

In step 1018 the other input values are calculated. For example: x, y and deviation are passed to the predicate-function. U-1 and U-2 are used to calculate the 0 percent point and 100 percent point on the input entity. These points are then passed as arguments.

Finally, in step 1020 the Absolute-direction predicate is executed and the result is returned.

Name Chain Example

In order to illustrate evaluation of a name-chain, a hypothetical example situation will be introduced. Suppose that the Three-stroke-A recognition-object of FIG. 2B has an unary-predicate with a reference chain: (:Tee-pee :Left-leg). This chain describes a path from the root Three-stroke-A object to the leaf Left-leg object. And suppose that the discovered-item-database has the following state:

| Discovered item | Recognition-object-name | Input-entity-name | Child-1 | Child-2 |
|---|---|---|---|---|
| 0 | Null-object | | | |
| 1 | | 1110 | | |
| 2 | | 1112 | | |
| 3 | | 1114 | | |
| 4 | Dash | | 3 | |
| 5 | Left-leg | | 2 | |
| 6 | Right-leg | | 1 | |
| 7 | Bar | | 1 | |
| 8 | Bar | | 1 | |
| 9 | Tee-Pee | | 5 | 6 |
| 10 | Three-stroke-A | | 4 | 9 |

Within the apply-predicate method it is necessary to determine which input-entity should be used as input to the predicate function. To achieve this the name chain is evaluated as follows:

The Tee-pee object is the second child of the Three-stroke-A recognition object, therefore go to the Child-2 of the Three-stroke-A discovered-item which is item 9 (Tee-pee). Left-leg is the Child-1 of the Tee-pee recognition-object so go to Child-1 of the Tee-pee discovered-item which is item 5 (Left-leg). Discovered-item 5 has only one child (Child-1=2), therefore go to Discovered-item 2. This item maps directly to input-entity 1112, which can now be used as an input to the predicate function.

Confirmed Recognition

A modification of the generate function is useful for some types of recognition. By modifying step 614 of the generate-1 method as follows, the resulting recognizer is modified to execute all available predicates to confirm the existence of the answer. That modification is indicated in italics below.

"In step 614, the collection of recognition-trees is tested to see if there is only one recognition tree and if the recognition-tree has only one recognition-object. If the test is true, the method is done and an answer that identifies the recognition-tree is returned (616). If the test is false the method continues with step 620."

For example, without this modification, the recognizer would execute only enough predicates to differentiate between the known possible answers. It would not continue on to actually confirm the answer. With the modification it will confirm the answer. In the new case there is little chance of having an object identified unless it is actually there, whereas in the previous version there is a finite possibility that the recognizer might return a wrong answer when it should have returned a don't-know answer.

Confirmed recognition is useful for recognition problems requiring that the recognizer be certain of its answer. This happens in recognition systems that allow for layering of one recognizer with another. The first recognizer must return don't-know when it really doesn't know, rather than making a best guess.

Multi-object Recognition

This recognition system can also be used for identifying and separating multiple objects from within a set of input data. This can be easily achieved by incrementally applying the Engine method to each subset of input-entities, saving the result, and returning to confirm the most likely answer. After a confirmed answer is found the input data associated with that answer is removed and the process is repeated.

This process is enhanced by the addition of a developer supplied property to each recognition-tree. This property indicates how many additional input-entities must be examined in order for the system to determine that the currently recognized set could not be subsumed by another recognition-tree. A simple example is the 1–3 B. In the case of recognizing this character the recognizer could prematurely conclude after seeing the first stroke that the answer is 1. However, the recognizer must wait at least one more stroke before reaching this conclusion because if the second stroke is a 3 and it is close enough to the 1, then the answer should be a B, not a 1 and a 3. In this case the max-n-input-entities value for the one (1) recognition-tree would be 2.

The steps of the method are:
1. For each subset of entities execute the engine method and store the result along with the max-n-input-entities value for the result in a table.
2. Examine the table from the end towards the front. If any stroke combination includes a character answer and the corresponding value of max-n-input-entities is less than the total strokes for the table, then stop, output that character, and remove its associated strokes, then repeat the process.

Note that if there are many strokes it is only necessary to examine as many strokes as the largest object in the set. Since the maximum number of strokes for a English character is 5, it would not be necessary to examine more than 5 strokes at a time.

For example, if the input is a B and an X and the strokes are as follows:
1. Down stroke of B.
2. 3 like stroke of B.
3. The / stroke of the X.
4. The \ stroke of the X.

Then the engine would be applied to the following sets of strokes (1), (1 2), (1 2 3), (1 2 3 4), and the results would be stored in a table:

| Strokes | Possible answer | Max-n-input-entities |
|---------|-----------------|----------------------|
| (1)     | 1               | 2                    |
| (1 2)   | B               | 3 (Because it might be part of a European B) |
| (1 2 3) | —               | —                    |
| (1 2 3 4) | —             | —                    |

In step two, stepping back from the end of the table the possible answer B for the stroke combination (1 2) is found. Since the max-n-input-entities for that object is 3, and the total strokes being considered is 4, it is confirmed that the shape is positively recognized. The two strokes of the B are removed and output as an answer and the process is continued.

| Strokes | Possible answer | Max-n-input-entities |
|---------|-----------------|----------------------|
| (3)     | / (divide)      | 2                    |
| (3 4)   | X               | 2                    |

Finally the X is removed from the input data and returned as an answer.

User Interface

The recognition system as described to this point does not explicitly include a method for the developer to create or modify the recognition-objects in the recognition-object-database. In fact there may be several ways to perform this operation. The technique disclosed in this patent is a language. Other methods might include a graphical user interface with multiple point and click operations.

A high level language allows the user to create and modify recognition-objects. Text for the language can be created and modified using any standard text editor and compiled using a specialized compiler.

The language has the following format:

(Defobject name properties unary-predicates binary-predicates child-1 child-2 fence-objects context-keys equal-mixins)

The items the Defobject specification map directly to a the slots of a recognition object.

Implementation

The core of the system has been implemented using the Macintosh Common Lisp software development system on an Apple Macintosh portable computer from Apple Computer Inc. This computer is connected via a standard serial port with a Wacom digitizing pad from Wacom Company of Japan, which is used for pen input.

Appendix:
Example recognition-object definitions:
Recognition-object[
NAME: Three-stroke-A
PROPERTIES:
   (Code     Ascii-A)
PREDICATES:
   (Distance-1
      Predicate-object
         function-name  Distance-from-line-?
         distance 25
         U-1-1 0
         U-1-2 100
         U-2-1 0
         Ref-1 (Tee-pee Left-leg)
         Ref-2 (Dash)
   Distance-2
      Predicate-object
         function-name  Distance-from-line-?
         distance 25
         U-1-1 0
         U-1-2 100
         U-2-1 0
         Ref-1 (Tee-pee Right-leg)
         Ref-2 (Dash))
CHILDREN
   Tee-pee   type Tee-pee
   Dash      type Dash]
Recognition-object[
NAME: Left-leg
PREDICATES:
   (Direction
      Predicate-object
         function-name  Absolute-direction
         x −1
         y 1
         deviation 45
         U-1 0
         U-2 100
   Straight
      Predicate-object
         function-name  Straight?
         deviation 45)
FENCE-OBJECTS (Bar))
Recognition-object[
NAME: Right-leg
PREDICATES:
   (Direction
      Predicate-object
         function-name  Absolute-direction
         x 1
         y 1
         deviation 45
         U-1 0
         U-2 100
   Straight
      Predicate-object
         function-name  Straight?
         deviation 45
FENCE-OBJECTS (Bar))
Recognition-object[
NAME: Dash
PREDICATES:
   (Direction
      Predicate-object
         function-name  Absolute-direction
         x 1
         y 0
         deviation 45
         U-1 0
         U-2 100
   Straight
      Predicate-object
         function-name Straight?
         deviation 45)]
Recognition-object[
NAME: Tee-Pee -continued

```
PREDICATES:
    (Close
        Predicate-object
            function-name  Relative-distance
            U-1 0
            U-2 0
            Deviation 25
            Ref-1 (Left-leg)
            Ref-2 (Right-leg))
CHILDREN
    Left-leg    type Left-leg
    Right-leg   type Right-leg}
Recognition-object[
NAME: Three-stroke-H
PROPERTIES:
    (Code    Ascii-H)
PREDICATES:
    (Distance-1
        Predicate-object
            function-name  Distance-from-line-?
            distance 25
            U-1-1 0
            U-1-2 100
            U-2-1 0
            Ref-1 (Two-bars Left-bar)
            Ref-2 (Dash)
     Distance-2
        Predicate-object
            function-name  Distance-from-line-?
            distance 25
            U-1-1 0
            U-1-2 100
            U-2-1 0
            Ref-1 (Two-bars Right-bar)
            Ref-2 (Dash))
CHILDREN
    Two-bars    type Two-bars
    Dash        type Dash}
Recognition-object[
NAME: Two-bars
PREDICATES:
    (Close
        Predicate-object
            function-name  Relative-distance
            U-1 0
            U-2 0
            Deviation 25
            Ref-1 (Left-bar)
            Ref-2 (Right-bar)
            Not? t)
CHILDREN
    Left-bar    type bar
    Right-bar   type bar}
Recognition-object[
NAME: Bar
PREDICATES:
    (Direction
        Predicate-object
            function-name  Absolute-direction
            x 0
            y 1
            deviation 45
            U-1 0
            U-2 100
     Straight
        Predicate-object
            function-name  Straight?
            deviation 45
FENCE-OBJECTS (Left-leg Right-leg))
```

What is claimed is:

1. In a data processing system, a method of generating an object recognition system for recognizing goal objects, each comprised of one or more input entities, the method performed by the data processing system comprising:

defining input entity recognition objects relative to input entities;

defining goal recognition objects relative to input entities through recognition object trees, each having input entity recognition objects as leaves and a goal object at its root; and generating from plural recognition object trees a decision tree of an object recognition system for recognizing goal objects from the input entities, the decision tree being separate from the recognition object trees and comprising decision nodes testing for recognition objects and comprising goal objects, from plural recognition object trees, at leaves of the decision tree, the step of generating the decision tree comprising, beginning at the root of the decision tree, recursively selecting, for the nodes of the decision tree, recognition objects from the recognition trees beginning from the leaves of the recognition trees, and grouping recognition trees to define branches from the nodes of the decision tree based on whether the recognition trees include the selected recognition objects.

2. A method as claimed in claim 1 wherein the step of generating an object recognition system comprises generating a decision tree for a group of recognition trees, the decision tree indicating at each node a test for a recognition object from the group of recognition object trees and branching from each node based on the results of the test, the decision tree testing for recognition objects of the recognition tree leaves near its root and providing goal recognition object decisions at its leaves.

3. A method as claimed in claim 1 wherein the step of generating an object recognition system comprises generating a decision tree for each group of recognition trees having the same number of leaves.

4. A method as claimed in claim 3 wherein the step of grouping recognition trees to define branches comprises including in true branches recognition trees which do not include the recognition object of the node but which include a recognition object which is likely to be confused with the recognition object of the node.

5. A method as claimed in claim 1 wherein the step of grouping recognition trees to define branches comprises including in true branches recognition trees which do not include the recognition object of the node but which include a recognition object which is likely to be confused with the recognition object of the node.

6. A method as claimed in claim 2 wherein the step of generating an object recognition system comprises generating a decision tree for each group of recognition trees having the same number of leaves.

7. In a data processing system a method of recognizing goal objects, each comprised of one or more input entities, the method performed by the data processing system comprising:

defining input entity recognition objects relative to input entities;

defining goal recognition objects relative to input entities through recognition object trees, each having input entity recognition objects as leaves and a goal object at its roots; and recognizing a goal recognition object from input entities by processing a decision tree which is separate from the recognition object trees but which comprises decision nodes testing for recognition objects, from the recognition object trees, with the goal recognition objects at leaves of the decision tree, the step of processing the decision tree comprising creating a discovered item database including the input entities and recognition objects identified at the nodes of the decision tree, the discovered item database supporting subsequent tests for recognition objects in the decision tree; and wherein the decision tree indicates at each node a test for recognition object, and the step of generating an objection recognition system comprises generating a decision tree for a group of recognition trees, the decision tree indicating at each node a test for a recognition object from the group of recognition object trees and branching from each node based on the results of the test, the decision tree testing for recognition objects of the recognition tree leaves near its root and providing goal recognition object decisions at its leaves.

8. In a data processing system a method of recognizing goal objects, each comprised of one or more input entities, the method performed by the data processing system comprising:

defining goal recognition objects relative to intermediate and input entity recognition objects at nodes of recognition object trees, each recognition object tree having input input entity recognition objects at its leaves and a goal recognition object at its root;

defining from plural recognition object trees a decision tree of tests for recognition objects, the decision tree being separate from the recognition object trees and having goal recognition object decisions at its leaves; and from the decision tree root performing tests at decision tree nodes on input entities for recognition objects of the recognition object tree nodes; and wherein the decision tree indicates at each node a test for a recognition object, and the step of generating an object recognition system comprises generating a decision tree for a group of recognition trees, the decision tree indicating at each node a test for a recognition object from the group of recognition object trees and branching from each node based on the results of the test, the decision tree testing for recognition objects of the recognition tree leaves near its root and providing goal recognition object decisions at its leaves.

9. A method as claimed in claim 8 wherein the step of processing the decision tree comprises creating a discovered item database including the input entities and recognition objects identified at the nodes of the decision tree, the discovered item database supporting subsequent tests for recognition objects in the decision tree.

10. A method as claimed in claim 8 wherein a decision tree is defined for each group of recognition trees having the same number of leaves.

11. A method as claimed in claim 8 wherein a decision tree is defined for each group of goal objects comprised of a common number of input entities, the method further comprising:

processing a plurality of successive input entities to recognize one or more goal objects comprised of different numbers of input entities; and where processing of successive input entities from a first input entity results in recognition of plural goal objects which share the first input entity, selecting as the recognized goal object the one of the plural goal objects having the greatest number of input entities and satisfying a maximal requirement as specified for that goal object, and repeating the process on the remaining input entities until a maximum number of input entities have been associated with goal objects.

12. In a data processing system a method of recognizing goal objects, each comprised of one or more input entities, the method performed by the data processing system comprising:

defining input entity recognition objects relative to input entities;

defining goal recognition objects relative to input entities through recognition object trees, each having input entity recognition objects as leaves and a goal recognition object at its root;

generating from the recognition object tree, a decision tree of tests for recognition objects, the decision tree being separate from the recognition object trees and having goal recognition object decisions at its leaves; and from the decision tree root, performing tests on input entities for recognition objects at the decision tree nodes; and wherein the step of generating an object recognition system comprises generating a decision tree for a group of recognition trees, the decision tree indicating at each node a test for a recognition object from the group of recognition object trees and branching from each node based on the results of the test, the decision tree testing for recognition objects of the recognition tree leaves near its root and providing goal recognition object decisions at its leaves.

13. In a data processing system a method of recognizing goal objects, each comprised of one or more input entities, the method performed by the data processing system comprising:

defining input entity recognition objects relative to input entities;

defining goal recognition objects relative to input entities through recognition object trees, each having input entity recognition objects as leaves and a goal recognition object at its root;

generating from the recognition object trees a decision tree of tests for recognition objects, the decision tree being separate from the recognition object trees and having goal recognition object decisions at its leaves; and from the decision tree root, performing tests on input entities for recognition objects at the decision tree nodes; and wherein the step of generating a decision tree comprises, beginning at the root of the decision tree, recursively selecting for the nodes of the decision tree recognition objects from the recognition trees beginning from the leaves of the recognition trees and grouping recognition trees to define branches from the nodes of the decision tree based on whether the recognition trees include the selected recognition objects.

14. A method as claimed in claim 12 wherein the step of generating an object recognition system comprises generating a decision tree for each group of recognition trees having the same number of leaves.

15. A method as claimed in claim 13 wherein the step of grouping recognition trees to define branches comprises including in true branches recognition trees which do not include the recognition object of the node but which include a recognition object which is likely to be confused with the recognition object of the node.

16. A pattern recognition system for recognizing goal objects, each comprised of one or more input entities, the system comprising in a data processing system:

a recognition object database of recognition trees, a recognition tree for each goal object, each recognition tree comprising a goal recognition object node at its root, intermediate recognition object nodes and input entity recognition object nodes at its leaves, the recognition object nodes comprising predicates for defining recognition objects relative to other recognition objects in the tree and input entities;

a decision tree generator for generating decision trees separate from recognition object trees, there being a decision tree for each group of recognition trees having the same number of leaves, each decision tree indicating at each node a test for a recognition object of the corresponding group of recognition object trees and branching from each node based on the results of the test, the decision trees indicating tests for recognition objects of the recognition tree leaves near its root and providing goal recognition decision at its leaves, the generator beginning at the root of a decision tree, recursively selecting for the nodes of the decision tree recognition objects from the recognition trees beginning from the leaves of the recognition trees and grouping recognition trees to define branches from the nodes of the decision tree based on whether the recognition trees include the selected recognition objects; and a recognition engine, for recognizing an object from input entities, which selects a decision tree corresponding to the number of input entities, performs test for recognition objects of the recognition object database at the decision tree nodes beginning at the root of the decision tree until a recognition object decision is made at a decision tree leaf, and creates a discovered item database including the input entities and recognition objects identified at the nodes of the decision tree, the discovered item database supporting subsequent tests for recognition objects in the decision tree.

17. A method as claimed in claim 12 where the decision tree includes true branches from fence recognition objects toward goal recognition objects which do not include the fence recognition objects.

\* \* \* \* \*